(12) United States Patent
Segev et al.

(10) Patent No.: US 9,924,397 B2
(45) Date of Patent: Mar. 20, 2018

(54) TIME OF FLIGHT WINDOW LIMIT SYNCHRONIZATION

(71) Applicant: Intel Corporation, Santa Clara, CA (US)

(72) Inventors: Jonathan Segev, Tel Mond (IL); Adrian P Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 14/912,347

(22) PCT Filed: Dec. 17, 2013

(86) PCT No.: PCT/US2013/075616
§ 371 (c)(1),
(2) Date: Feb. 16, 2016

(87) PCT Pub. No.: WO2015/038176
PCT Pub. Date: Mar. 19, 2015

(65) Prior Publication Data
US 2016/0205576 A1  Jul. 14, 2016

Related U.S. Application Data

(60) Provisional application No. 61/877,414, filed on Sep. 13, 2013, provisional application No. 61/877,630, filed on Sep. 13, 2013.

(51) Int. Cl.
*H04W 24/10* (2009.01)
*H04W 56/00* (2009.01)

(52) U.S. Cl.
CPC ....... *H04W 24/10* (2013.01); *H04W 56/0045* (2013.01); *H04W 56/0065* (2013.01)

(58) Field of Classification Search
None
See application file for complete search history.

(56) References Cited

U.S. PATENT DOCUMENTS 7,477,621 B1    1/2009  Loc et al.
7,610,018 B2 *  10/2009 Marin .............. H04W 36/06
                                              370/437

(Continued)

FOREIGN PATENT DOCUMENTS

JP    2010050964 A    3/2010
JP    2010062743 A    3/2010

(Continued)

OTHER PUBLICATIONS

"International Application Serial No. PCT/US2013/075616, International Search Report dated Jun. 20, 2014", 3 pgs.

(Continued)

*Primary Examiner* — Andrew Lai
*Assistant Examiner* — Jamaal Henson
(74) *Attorney, Agent, or Firm* — Schwegman Lundberg & Woessner, P.A.

(57) ABSTRACT

Generally discussed herein are systems and apparatuses arranged to perform a Time-of-Flight (ToF) or Round Trip Time measurement. The disclosure also includes techniques of making and using the systems and apparatuses. According to an example a station (STA) can be arranged to perform a Time-of-Flight (ToF) measurement, the STA can include a transceiver arranged to transmit a hard constraint indicating a time window in which the STA is unavailable for performing the ToF measurement, and receive an action frame of the ToF measurement from another STA at a time that is outside the time window.

11 Claims, 6 Drawing Sheets

(56) References Cited

U.S. PATENT DOCUMENTS

| | | |
|---|---|---|
| 2006/0214848 A1 | 9/2006 | Roberts |
| 2008/0198875 A1* | 8/2008 | Qin .................... H04W 72/085 370/468 |
| 2010/0054139 A1* | 3/2010 | Chun .................... H04L 1/1678 370/252 |
| 2010/0150117 A1 | 6/2010 | Aweya et al. |
| 2011/0222524 A1 | 9/2011 | Thomson et al. |
| 2012/0163261 A1 | 6/2012 | Vedantham et al. |
| 2013/0211780 A1 | 8/2013 | Meador et al. |
| 2013/0336131 A1* | 12/2013 | Zhang .................. H04W 24/00 370/252 |

FOREIGN PATENT DOCUMENTS

| | | |
|---|---|---|
| JP | 2011109598 A | 6/2011 |
| WO | WO-2013016221 A1 | 1/2013 |
| WO | WO-2013119878 A1 | 8/2013 |
| WO | WO-2015038176 A1 | 3/2015 |

OTHER PUBLICATIONS

"International Application Serial No. PCT/US2013/075616, Written Opinion dated Jun. 20, 2014", 5 pgs.

"European Application Serial No. 13893492.2, Extended European Search Report dated Mar. 29, 2017", 7 pgs.

"Japanese Application Serial No. 2016-534572, Office Action dated Feb. 14, 2017", w/ English Translation, 9 pgs.

"Japanese Application Serial No. 2016-534572, Response filed May 11, 2017 to Office Action dated Feb. 14, 2017", w/ English Claims, 21 pgs.

"Korean Application Serial No. 2016-7003621, Office Action dated Jan. 17, 2017", w/English Translation, 6 pgs.

"Korean Application Serial No. 2016-7003621, Response filed Mar. 17, 2017 to Office Action dated Jan. 17, 2017", w/ English Claims, 17 pgs.

"European Application Serial No. 13893492.2, Response filed Oct. 13, 2017 to Extended European Search Report dated Mar. 29, 2017", 15 pgs.

* cited by examiner

TIME OF FLIGHT WINDOW LIMIT SYNCHRONIZATION

RELATED APPLICATION

This application is a U.S. National Stage Filing under 35 U.S.C. 371 from International Application No. PCT/US2013/075616, filed on Dec. 17, 2013, and published as WO 2015/038176 on Mar. 19, 2015, which claims priority to U.S. Provisional Application Ser. No. 61/877,414, filed Sep. 13, 2013, and to U.S. Provisional Application Ser. No. 61/877,630, filed Sep. 13, 2013, all of which are incorporated herein by reference in their entirety.

TECHNICAL FIELD

Examples generally relate to determining a Time-of-Flight (ToF) or a Round Trip Time (RTT) of one or more signals travelling between two STAtions (STAs), and more specifically to broadcasting a schedule or transmitting hard constraints to help with scheduling a TOF or RTT measurement.

TECHNICAL BACKGROUND

A station (STA) can, in general, only communicate using one channel at a time. An STA communicating on a channel cannot communicate with another STA that is communicating using another channel. When such a scenario occurs it is called a conflict. Conflicts can result in additional signaling between STAs, thus consuming more energy, and can also result in more channel bandwidth being used.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Examples in this disclosure relate to apparatuses, systems, and techniques for determining a Time Of Flight (TOF) or a Round Trip Time (RTT) measurement between two STAtions (STAs), and more specifically to broadcasting a schedule or transmitting hard constraints to help with scheduling a TOF or RTT measurement.

Figure 1:
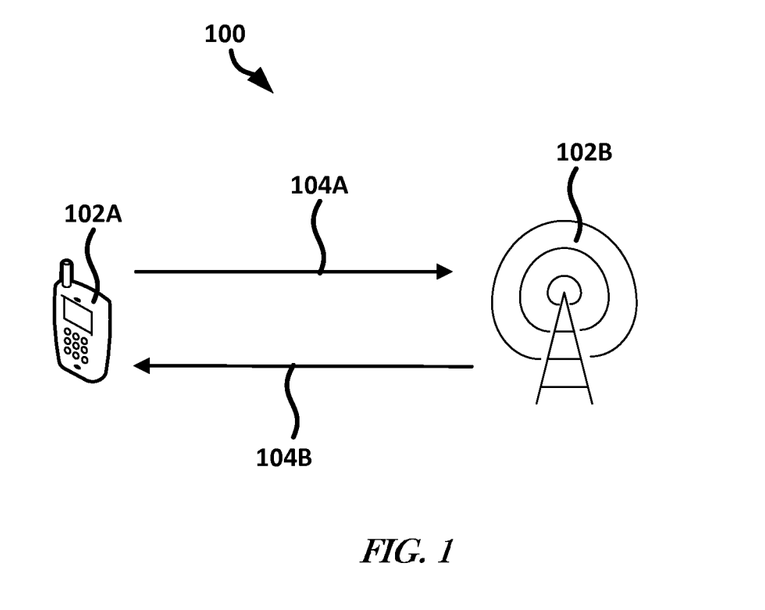
FIG. 1 shows an example of two stations (STAs) communicating.

FIG. 1 shows an STA 102A communicating with an STA 102B. As shown in FIG. 1, STA 102A is a User Equipment (UE) device and STA 102B is an Access Point (AP), such as a WiFi AP or other AP. STA 102A-B can be any of a UE (e.g., laptop, desktop computer, Personal Digital Assistant (PDA), phone, or the like) or AP, or other device that has the capability to use the protocol detailed herein. The STA 102A-B can be mobile or stationary.

The STA 102A-B can measure a TOF or RTT of one or more signals 104A or 104B travelling from one STA 102A-B to the other STA 102A-B. A TOF measurement consists of measuring a time it takes for a signal 104A or 104B to travel from one STA 102A-B to the other STA 102B-A. An RTT measurement consists of measuring the time it takes for a signal 104A or 104B to be sent from the STA 102A-B and for the STA102A-B to receive a signal 104B or 104A in response to the signal sent. As depicted in FIG. 1, the time it takes signal 104A or 104B individually to be transmitted from the STA 102A or 102B, respectively, and received at the other STA 102B or 102A, respectively, represents a TOF time. As depicted in FIG. 1, the time it takes signals 104A and 104B in combination to be transmitted from the STA 102A and 102B, respectively, and received at the other STA 102B and 102A, respectively, is an RTT time. RTT and TOF are described in more detail with regard to FIGS. 2 and 4.

Figure 2:
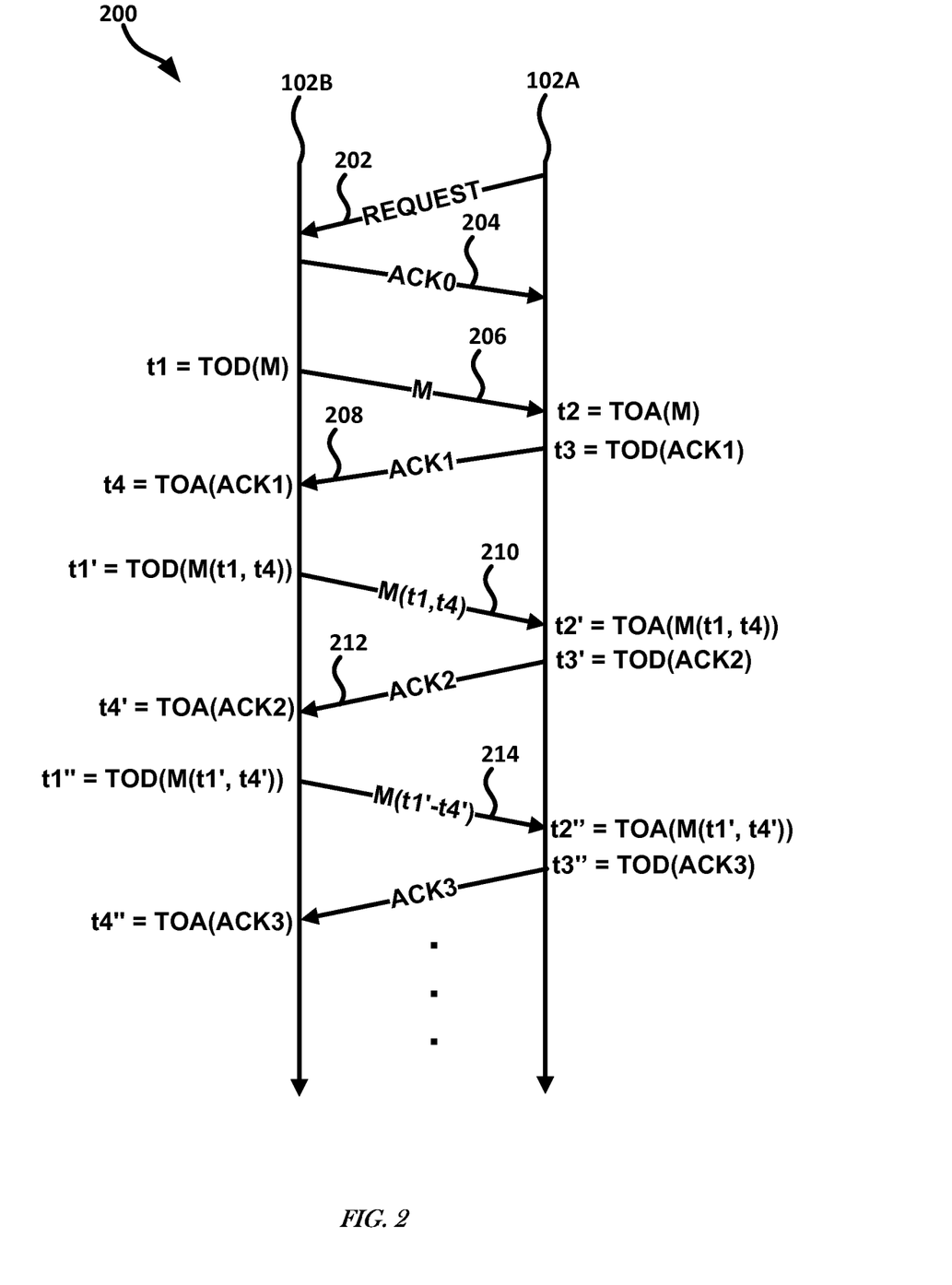
FIG. 2 shows an example of a communication technique configured to determine a TOF or RTT.

FIG. 2 is a flow diagram depicting a technique 200 for determining a TOF or RTT according to the Institute of Electrical and Electronics Engineers (IEEE) 802.11 Revision mc D1.0 standard. The vertical lines indicate the passage of time with time passing from 202 to 214. At 202, a Fine Timing Measurement (FTM) request can be sent from the STA 102A to the STA 102B. At 204, the STA 102B can acknowledge receipt of the request. At 206, the STA 102B can send an action frame "M" to the STA 102A. The STA 102B can record the Time Of Departure (TOD) of the action frame "M" ($t1$). The STA 102A can record the Time Of Arrival (TOA) of the action frame "M" ($t2$).

At 208, the STA 102A can acknowledge that it received the action frame "M". The STA 102A can record a TOD of the acknowledgment of receiving the action frame "M" ($t3$). The STA 102B can record a TOA of the acknowledgment ($t4$). At 210, STA 102B can send another action frame "M($t1,t4$)" to the STA 102A. This action frame "M($t1,t4$)" can include recorded times $t1$ and $t4$ or a number equal to the difference between the recorded time $t4$ and $t1$. The STA 102B can record a TOD of this action frame "M($t1,t4$)" ($t1'$).

The STA 102A can determine an RTT or TOF of one or more communications between the STA 102A and the STA 102B. The RTT can be determined as a function of $t1$, $t2$, $t3$, and $t4$. The RTT can be determined by determining a difference between $t4$ and $t1$ and subtracting a difference between $t3$ and $t2$ from the difference between $t4$ and $t1$ (i.e. RTT=($t4-t1$)-($t3-t2$)). Alternatively, the RTT can be determined by determining a difference between $t2$ and $t1$ and a difference between $t4$ and $t3$ and adding the differences (i.e. RTT=($t2-1$)+($t4-t3$)).

The TOF can be determined as a function of $t1$ and $t2$, or $t3$ and $t4$. The TOF can be determined by determining a difference between $t2$ and $t1$ (e.g., to determine a TOF of a signal from the STA 102B to the STA 102A) or a difference between $t4$ and $t3$ (e.g., to determine a TOF of a signal from the STA 102A to the STA 102B). The measurement can repeat, so as to make another RTT or TOF measurement, such as shown at 210, 212, and 214.

The STA 102A can initiate an FTM session concurrently with a number of APs (the STA 102B can represent a single AP) to perform ranging (e.g., a TOF or RTT measurement). Using the ranging information, the STA 102B can determine its position, such as by using trilateration or triangulation. The STA 102B can indicate a soft constraint (e.g., a preferred schedule or timing of an FTM session) in the FTM request, at 202. The STA 102B can "rework" that schedule by sending the action frame M, at 206, at any time, regardless of the soft constraint. The STA 102A can perform concurrent FTM sessions. However, not all FTM sessions may occur on the same channel. Also, the STA 102B may not be able or may not be willing to comply with the soft constraint of the STA 102A (e.g., lack of resources, scheduling limitations, implementation consideration, or the like). Since no further information exists, the STA 102B can allocate a time window which overlaps other concurrent FTM sessions (see FIG. 3).

Figure 3:
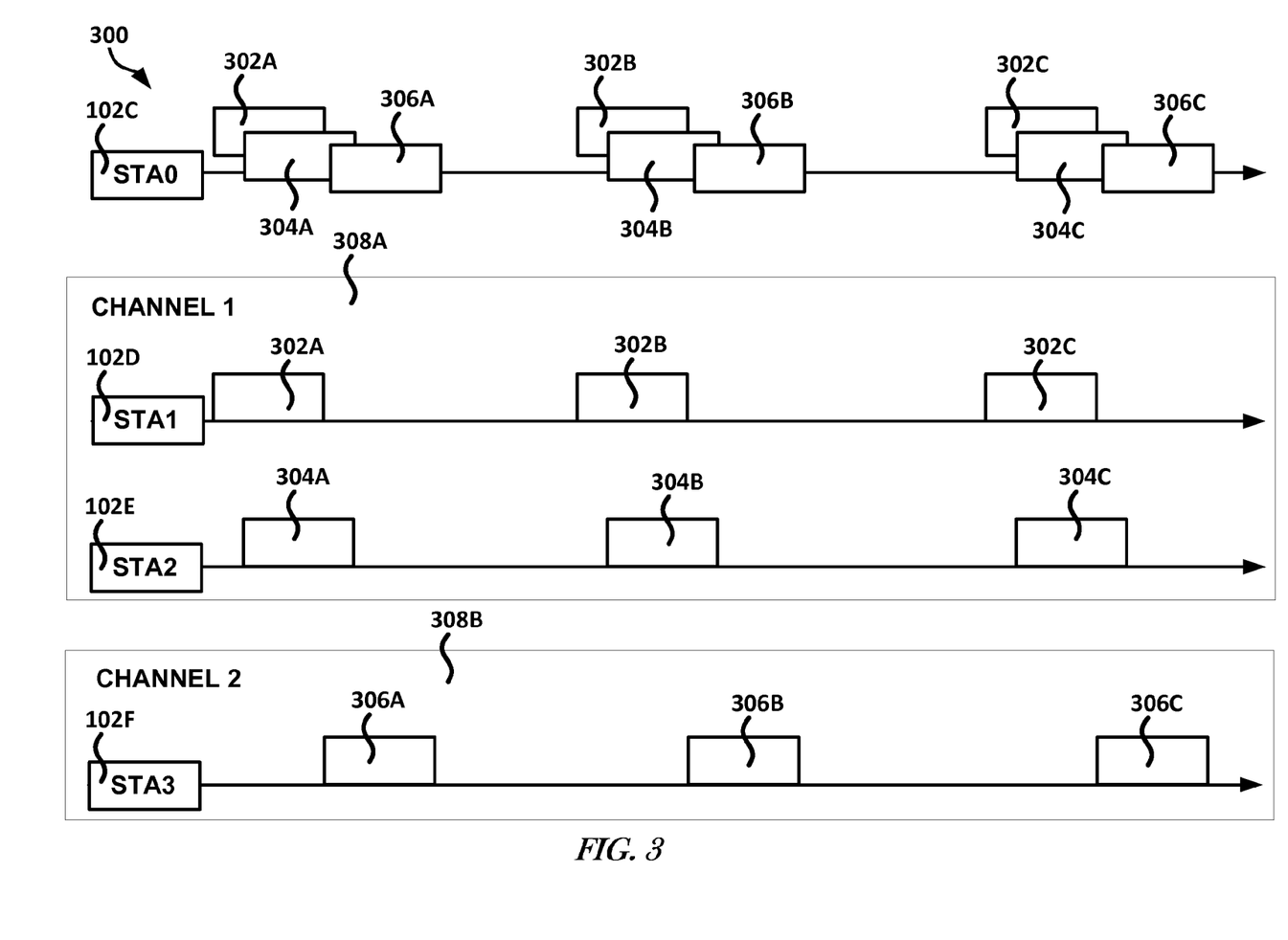
FIG. 3 shows an example of how the technique of FIG. 2 can result in a conflict.

FIG. 3 illustrates how a persistent conflict can occur using the technique 200. Currently there is no consideration of whether STA 102A is available when the STA 102B responds. A conflict can occur when multiple STAs 102D, 102E, and 102F attempt to communicate with the STA 102C, such as shown in FIG. 3. In FIG. 3, the arrow indicates passing time, and time windows 302A, 302B, and 302C, 304A, 304B, and 304C, and 306A, 306B, and 306C indicate time windows in which STAs 102D, 102E, and 102F, respectively, attempt to communicate with the STA 102C. The STAs 102D and 102E are attempting to communicate with the STA 102C on a channel 308A and the STA 102F is attempting to communicate with the STA 102C on a different channel 308B.

As shown in FIG. 3, a persistent conflict occurs between STA 102E and STA 102F. The STA 102E is attempting to communicate with the STA 102C using the channel 308A while, at the same time, the STA 102F is attempting to communicate with the STA 102C using the channel 308B. Since the STA 102C can only communicate using one channel 308A-B at a time, a conflict as to which channel 308A-B to communicate on is created. This is indicated by the overlapping time windows 304A and 306A, 304B and 306B, and 304C and 306C. The problem can be persistent (e.g., recurring) if the STAs 102E and 102F attempt to communicate with the STA 102C at periodic or fixed intervals, such as with a predetermined or fixed amount of time between communication attempts. These conflicts can cause the STA 102E-F to attempt to communicate with the STA 102C again, thus consuming more time, bandwidth, or power as compared to a situation where there are fewer or no conflicts.

Figure 4:
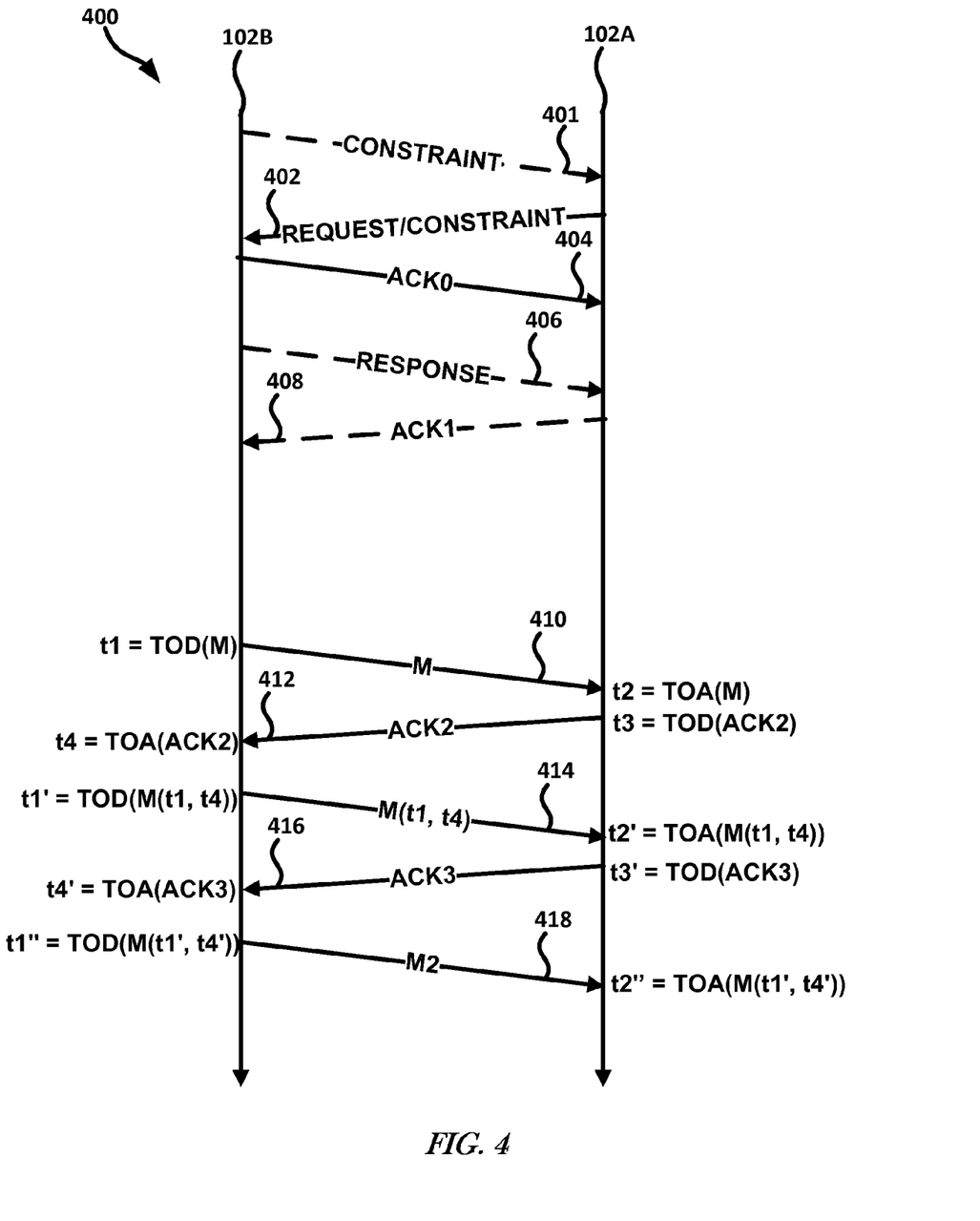
FIG. 4 shows an example of a technique for scheduling or determining a TOF or RTT.

FIG. 4 is a flow diagram depicting an example of a technique 400 for determining a TOF or RTT of one or more signals communicated between STA 102A and 102B. At 401, the STA 102B can optionally broadcast scheduling resource availability to one or more STAs, such as the STA 102A or 102C-F. The broadcasted availability can indicate a short or long time window in which the STA 102B is available or unavailable (e.g., can include a hard constraint (i.e. an indication that the STA 102B is unavailable for a period of time) or a soft constraint (i.e. an indication that the STA 102B would prefer not to communicate during a period of time or that other times for communicating with the STA 102B might be available). The other STA's 102A or 102C-F requests can be serviced on a first come, first served basis. In other words, when the STA 102A indicates its availability to a plurality of other STAs 102B-F, the STA 102A can service the STA 102B-F that responds first within the availability period. As used herein, a short time window is a time window long enough to service one STA (e.g., a time window long enough to perform a single TOF or RTT measurement), while a long time window is a time window long enough to service at least two STAs.

The STA 102A or 102C can make a request, such as at 402, for resource allocation consistent with the broadcasted constraint(s) (e.g., in a time period indicated as available or in a time period not indicated as unavailable by the STA 102B). In one or more embodiments, the STA 102A can make a request only if the resource scheduling is compliant to their needs (e.g., the STA 102A is available or the schedule is consistent with the hard constraint(s) of the STA 102A).

By having the STA 102A aware of the resource scheduling limitations of the STA 102B, the STA 102B can be less likely to make a request, such as at 402, which cannot be complied with. Reducing the number of requests that cannot be serviced by the STA 102B can reduce the medium usage or signal delay or signal jitter of a signal in the medium. By having the STA 102A aware of the resource scheduling limitations of the STA 102B, the STA 102A cab make a request, such as at 402, which takes into account both the STA 102A soft constraints (e.g., power consumption) as well as the STA 102A hard constraints (e.g., multi-channel operation). Hard constraints are discussed in more detail herein, including in the discussion of item 402 of FIG. 4.

The STA 102B can communicate the timing limitation (e.g., hard or soft constrains) of its resources for FTM through a broadcast, such as in a unique management frame, such as at 401. The communication of the timing limitations can be an information element in a beacon frame, a subset of the beacon frame (e.g., a Delivery Traffic Indication Message (DTIM) beacon), or a short beacon (e.g., a beacon similar to a Fast Initial Link Setup (FILS) discovery beacon), among others. The communication of the timing limitations can be similar in form to the form of information obtained via an Access Network Query Protocol (ANQP) based procedure, where the scheduling of one or more STAs 102B-F (e.g., APs) can be obtained.

At 402, a Fine Timing Measurement (FTM) request can be sent from the STA 102A to the STA 102B. The request can include one or more constraints, such as hard or soft constraints, such as one or more constraints configured to aid in scheduling an FTM measurement. The request can be transmitted at a time consistent with the availability indicated in the broadcast (e.g., at 401). The request can include a request for a time indicated as available in a broadcast, such as at 401.

The hard or soft constraints (from either STA102A or 102B) can be transmitted in the form of a schedule. The hard or soft constraints can be represented in a frame, such as at 401 or 402, among others, by one or more fields, elements, or subelements. The fields, elements, or subelements, can be in addition to those described in 802.11 REVmc D1.0. These fields, elements, or subelements can convey a periodic window during which future ToF or RTT measurement exchanges can take place. The window can be represented by an interval, duration, or offset to some known event or time. The known event or time can be common knowledge to both STA 102A and STA 102B, such as the time of transmission of a frame, such as at 401 or 402, among others. One of ordinary skill in the art will recognize that there are various other ways of transmitting the hard or soft constraints from one STA 102A or 102B to another STA 102B or 102A.

The hard or soft constraints can be transmitted to the STA 102B in a variety of formats. Examples of formats for transmitting the hard or soft constraints can include: (1) a bit map where each bit provides information of availability with a known granularity (e.g., a fixed time period, such a number of microseconds, milliseconds, seconds, minutes, etc.) per bit, where a set bit indicates availability and a clear bit indicates unavailability or vice versa; or (2) a parametric format where the start and end of one or more unavailability periods are described.

The transmission of the hard or soft constraints can be compressed by the STA 102A-B before being sent to the STA 102B-A. The STA 102A-B can decompress the transmission and determine the unavailability or availability of the STA 102B-A based on the decompressed packet. The compression can include lossless compression techniques, such as can include Huffman coding or arithmetic coding. Some examples of lossless compression techniques include Lempel-Ziv-Welch, Context Tree Weighting (CTW), Burrows-Wheeler transform, Lempel Ziv 77, or Prediction by Partial Matching (PPM).

The time reference for the unavailability period can be explicit or implicit. An example of an explicit time reference can include specifying the time reference (e.g., with or without a specific granularity in the request), such as at 402. Another example of an explicit time reference can include basing the time reference granularity on the Time Synchronization Function (TSF) of the STA 102A-B. An example of an implied time reference can include the STA 102A-B referencing a transmission time or reception time of the request, such as at 402. The granularity can be fixed (e.g., explicitly included in a request or implicit by being pre-agreed by either a standard or a specification) or variable, such as previously described.

At 404, the STA 102B can acknowledge receipt of the request. Optionally, at 406, the STA 102B respond to the request. The response can include an allocation of time within the constraint(s) sent from the STA 102A. The STA 102A can then schedule a specific time, such as the time allocated by the STA 102B, to listen to the channel that the STA 102B is communicating on. At 408, the STA 102A can optionally acknowledge the response sent from the STA 102B.

At 410, the STA 102B can send an action frame "M" to the STA 102A. The STA 102B can record the Time Of Departure (TOD) of the action frame "M" (t1). The STA 102A can record the Time Of Arrival (TOA) of the action frame "M" (t2). At 412, the STA 102A can acknowledge that it received the action frame "M". The STA 102A can record a TOD of the acknowledgment of receiving the action frame "M" (t3). The STA 102B can record a TOA of the acknowledgment (t4). At 414, STA 102B can send another action frame "M(t1,t4)" to the STA 102A. This action frame "M(t1,t4)" can include recorded times t1 and t4 or a number equal to the difference between the recorded time t4 and t1. The STA 102B can record a TOD of this action frame "M(t1,t4)" (t1').

The STA 102A can determine an RTT or TOF of one or more communications between the STA 102A and the STA 102B. The RTT can be determined as a function of t1, t2, t3, and t4. The RTT can be determined by determining a difference between t4 and t1 and subtracting a difference between t3 and t2 from the difference between t4 and t1 (i.e. RTT=(t4−t1)−(t3−t2)). Alternatively, the RTT can be determined by determining a difference between t2 and t1 and a difference between t4 and t3 and adding the differences (i.e. RTT=(t2−t1)+(t4−t3)). The TOF can be determined as a function of t1 and t2, or t3 and t4. The TOF can be determined by determining a difference between t2 and t1 (e.g., to determine a TOF of a signal from the STA 102B to the STA 102A) or a difference between t4 and t3 (e.g., to determine a TOF of a signal from the STA 102A to the STA 102B). The measurement can repeat, so as to make another RTT or TOF measurement, such as shown at 414, 416, and 418.

Figure 5:
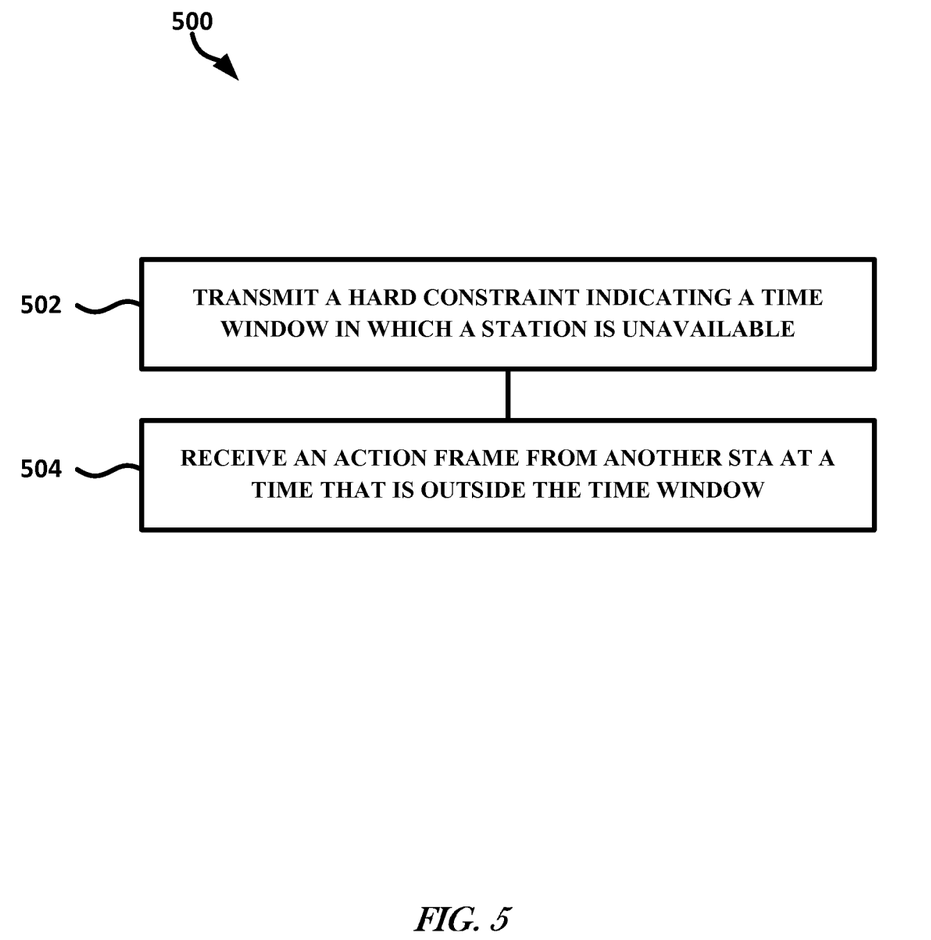
FIG. 5 shows an example of a technique for determining a time of flight.

FIG. 5 shows an example of a technique 500 for scheduling or determining a TOF or RTT measurement. At 502, a hard constraint can be transmitted, such as by using a transceiver of the STA 102A, the hard constraint indicating a time window in which the STA 102A is unavailable. Transmitting the hard constraint can include transmitting the hard constraint as a bit map, wherein each bit of the bit map corresponds to a specified amount of time and wherein a set bit indicates the STA is unavailable and a not set bit indicates the STA is available. At 504, an action frame can be received, such as at the transceiver, from another STA 102A at a time that is outside the time window.

The technique 500, can include receiving, such as by using the transceiver, a broadcast of a hard or soft constraint of the STA 102B, the second hard constraint indicating a time window in which the STA 102B is unavailable to communicate, such as to help with performing a ToF or RTT measurement. The technique 500 can include receiving, such as by using the transceiver, a time allocation from the STA 102B. The time allocation can specify a time window in which the STA 102B will transmit the action frame. The time window indicated by the action frame can be outside the time window(s) indicated by the hard constraint(s). The technique 500 can include measuring an RTT or ToF time for a communication between the STA and the another STA at a time outside the first and second time windows.

Figure 6:
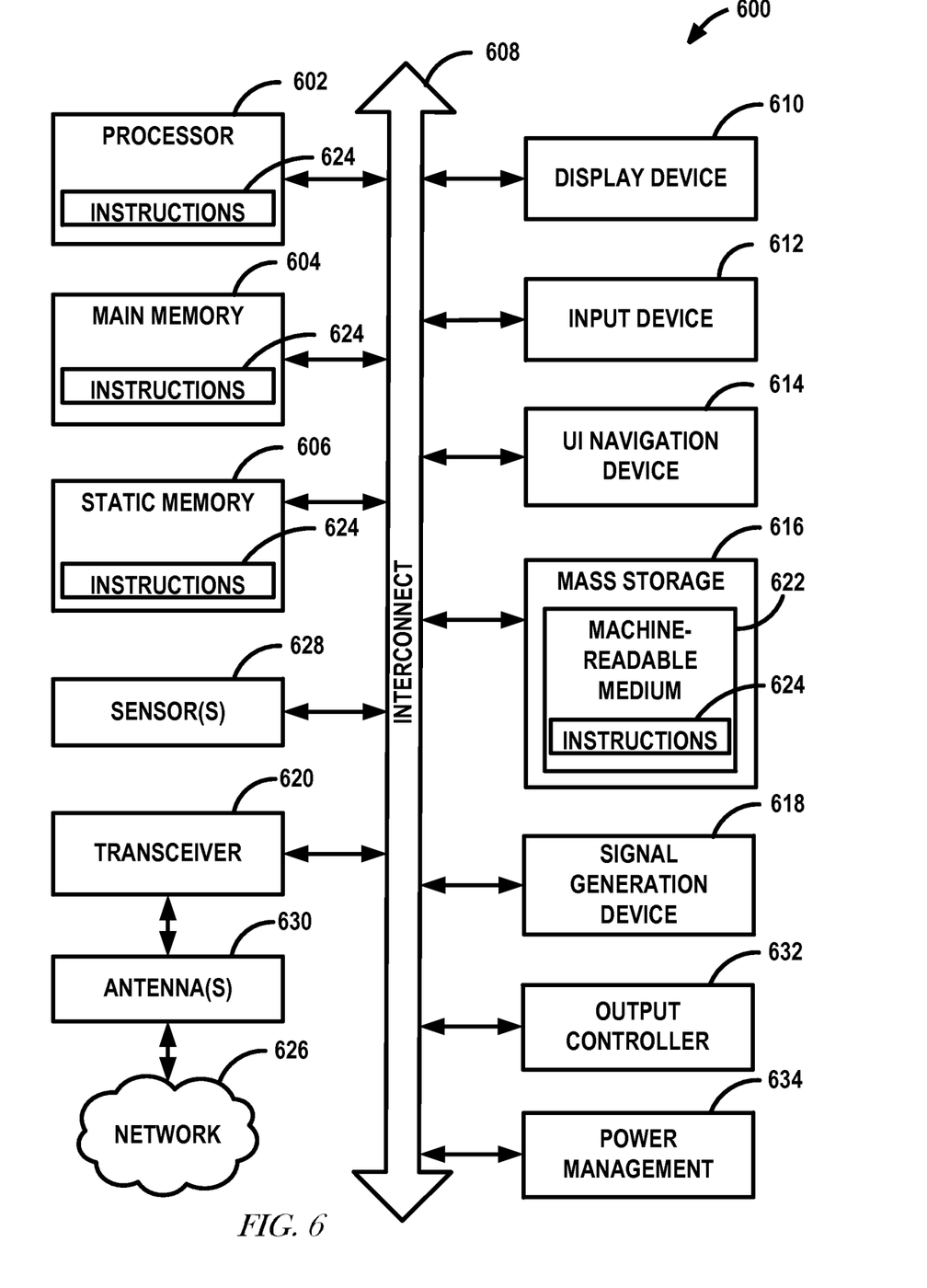
FIG. 6 shows an example of a computer system.

FIG. 6 is a block diagram illustrating an example computer system 600 machine which can include a reusable core panel discussed herein. Computer system 600 can be a computing device. In an example, the machine can operate as a standalone device or can be connected (e.g., via a cellular network) to other machines. The computer system can be included in the STA 102A-F. In a networked deployment, the machine can operate in the capacity of either a server or a client machine in server-client network environments, or it can act as a peer machine in peer-to-peer (or distributed) network environments. Further, while only a single machine is illustrated, the term "machine" shall also be taken to include any collection of machines that individually or jointly execute a set (or multiple sets) of instructions to perform any one or more of the methodologies discussed herein.

Example computer system 600 can include a processor 602 (e.g., a Central Processing Unit (CPU), a Graphics Processing Unit (GPU) or both), a main memory 604 and a static memory 606, which communicate with each other via an interconnect 608 (e.g., a link, a bus, etc.). The computer system 600 can further include a video display unit 610, an alphanumeric input device 612 (e.g., a keyboard), and a User Interface (UI) navigation device 614 (e.g., a mouse). In an example, the video display unit 610, input device 612 and UI navigation device 614 are a touch screen display. The computer system 600 can additionally include a storage device 616 (e.g., a drive unit), a signal generation device 618 (e.g., a speaker), an output controller 632, a power management controller 634, and a transceivers 620 (which can include or operably communicate with one or more antennas 630, radios, or other wired or wireless communications hardware), and one or more sensors 628, such as a GPS sensor, compass, location sensor, accelerometer, or other sensor. The transceiver 620 can be arranged to transmit or receive communications to or from a respective STA 102A-F.

The storage device 616 can include a non-transitory machine-readable medium 622 on which can be stored one or more sets of data structures and instructions 624 (e.g., software) embodying or utilized by any one or more of the methodologies or functions described herein. The instructions 624 can also reside, completely or at least partially, within the main memory 604, static memory 606, or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" can include a single medium or multiple media (e.g., a centralized or distributed database, and/or associated caches and servers) that store the one or more instructions 624. The term "machine-readable medium" shall also be taken to include any tangible medium that can be capable of storing, encoding or carrying instructions for execution by the machine and that cause the machine to perform any one or more of the methodologies of the present disclosure or that can be capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 624 can further be transmitted or received over a network (e.g., a distributed or hybrid distributed and centralized cellular network) using a transmission medium via the transceiver 620 utilizing any one of a number of well-known transfer protocols (e.g., OFDMA, SC-FDMA, TDMA, TDMA, CDMA, or other channel access method). The term "transmission medium" shall be taken to include any intangible medium that can be capable of storing, encoding, or carrying instructions for execution by the machine, and includes digital or analog communications signals or other intangible medium to facilitate communication of such software.

Examples and Notes

The subject matter of the disclosure can be described by way of several Examples.

Example 1 can include or use subject matter (such as an apparatus, a method, a means for performing acts, or a device readable memory including instructions that, when performed by the device, can cause the device to perform acts), such as can include or use a wireless STA arranged to perform a Time-of-Flight (ToF) measurement. Example 1 can include the STA including a transceiver arranged to transmit a hard constraint indicating a time window in which the STA is unavailable for performing the ToF measurement, and receive an action frame of the ToF measurement from another STA at a time that is outside the time window.

Example 2 can include or use, or can optionally be combined with the subject matter of Example 1, to include or use wherein the hard constraint is a first hard constraint and the time window is a first time window, and wherein the transceiver is further arranged to receive a broadcast of a second hard constraint of the another STA, the second hard constraint indicating a second time window in which the another STA is unavailable for communicating with the STA.

Example 3 can include or use, or can optionally be combined with the subject matter of at least one of Examples 1-2, to include or use wherein the transceiver is further arranged to receive a time allocation from the another STA, the time allocation specifying a third time window in which the another STA will transmit the action frame, the third time window outside the first and second time windows.

Example 4 can include or use, or can optionally be combined with the subject matter of at least one of Examples 1-3, to include or use wherein the transceiver is arranged to transmit the first hard constraint as a bit map, wherein each bit of the bit map corresponds to a specified amount of time and wherein a set bit indicates the STA is unavailable for performing the ToF measurement and a not set bit indicates the STA is available to perform the ToF measurement.

Example 5 can include or use, or can optionally be combined with the subject matter of at least one of Examples 1-4, to include or use wherein the transceiver is arranged to receive the action frame within the time allocation and the STA is arranged to determine a round trip time of time of flight of one or more signals communicated between the STA and the another STA at a time outside the first and second time windows.

Example 6 can include or use, or can optionally be combined with the subject matter of at least one of Examples 1-5, to include or use wherein the STA is further arranged to determine a plurality of round trip times or time of flight times, each round trip time or time of flight time for a communication between the STA and a different respective STA.

Example 7 can include or use, or can optionally be combined with the subject matter of at least one of Examples 1-6, to include or use wherein the STA is further arranged to determine a location of the STA as function of the plurality of round trip times or time of flight times.

Example 8 can include or use, or can be optionally combined with the subject matter of at least one of Examples 1-7, to include subject matter (such as an apparatus, a method, a means for performing acts, or a device readable memory including instructions that, when performed by the device, can cause the device to perform acts), such as can include or use a wireless station (STA) arranged to communicate with another STA of a plurality of STAs so as to help the another STA perform a Time-of-Flight (ToF) measurement. Example 8 can include or use the STA including a transceiver arranged to broadcast to the plurality of other STAs a hard constraint of the STA, the hard constraint indicating a time window in which the STA is unavailable to communicate with the other STAs, and transmit an action frame of the ToF measurement from the STA to the another STA at a time outside the time window.

Example 9 can include or use, or can optionally be combined with the subject matter of at least one of Examples 1-8, to include or use wherein the hard constraint is first hard constraint and the time window is a first time window, wherein the transceiver is arranged to receive a second hard constraint indicating a second time window in which the another STA is unavailable to perform the ToF measurement, or wherein the transceiver is arranged to transmit the action frame at a time outside the first and second time windows.

Example 10 can include or use, or can optionally be combined with the subject matter of at least one of Examples 1-9, to include or use wherein the transceiver is arranged to transmit a time allocation to the another STA, the time allocation specifying a third time window in which the STA will transmit the action frame, the third time window outside the first and second time windows.

Example 11 can include or use, or can optionally be combined with the subject matter of at least one of Examples 1-10 to include or use wherein the transceiver is arranged to transmit the first hard constraint as a bit map, wherein each bit of the bit map corresponds to a specified amount of time and wherein a set bit indicates the STA is unavailable to communicate with the plurality of other STAs and a not set bit indicates the STA is available to communicate with an STA of the plurality of other STAs.

Example 12 can include or use, or can optionally be combined with the subject matter of at least one of Examples 1-11 to include or use wherein the transceiver is arranged to transmit the first hard constraint as one or more parameters indicating a beginning time and ending time of a period of time in which the STA is unavailable.

Example 13 can include or use, or can optionally be combined with the subject matter of at least one of Examples 1-11 to include or use wherein the transceiver is arranged to transmit the specified amount of time in the broadcast.

Example 14 can include or use, or can optionally be combined with the subject matter of at least one of Examples 1-11 to include or use wherein the specified amount of time is predetermined and is the transceiver is not arranged to transmit the specified amount of time in the broadcast.

Example 15 can include or use, or can optionally be combined with the subject matter of at least one of Examples 1-11 to include or use wherein the STA is arranged to compress, using a lossless compression technique, data corresponding to the bit map prior to broadcasting the first constraint.

Example 16 can include or use, or can be optionally combined with the subject matter of at least one of Examples 1-15, to include subject matter (such as an apparatus, a method, a means for performing acts, or a device readable memory including instructions that, when performed by the device, can cause the device to perform acts), such as can include or use transmitting, using a transceiver, a hard constraint indicating a time window in which an STA is unavailable, or receiving, using the transceiver, an action frame from another STA at a time that is outside the time window.

Example 17 can include or use, or can optionally be combined with the subject matter of at least one of Examples 1-16 to include or use wherein the hard constraint is a first hard constraint and the time window is a first time window, and the method can further include receiving, using the transceiver, a broadcast of a second hard constraint of the another STA, the second hard constraint indicating a second time window in which the another STA is unavailable.

Example 18 can include or use, or can optionally be combined with the subject matter of at least one of Examples 1-17 to include or use receiving, using the transceiver, a time allocation from the another STA, the time allocation specifying a third time window in which the another STA will transmit the action frame, the third time window outside the first and second time windows indicated by the hard constraint.

Example 19 can include or use, or can optionally be combined with the subject matter of at least one of Examples 1-18 to include or use wherein the transmitting the first hard constraint includes transmitting the first hard constraint as a bit map, wherein each bit of the bit map corresponds to a specified amount of time and wherein a set bit indicates the STA is unavailable and a not set bit indicates the STA is available.

Example 20 can include or use, or can optionally be combined with the subject matter of at least one of Examples 1-19 to include or use measuring a round trip time or time of flight time for a communication between the STA and the another STA at a time outside the first and second time windows.

Example 21 can include or use, or can be optionally combined with the subject matter of at least one of Examples 1-20, to include subject matter (such as an apparatus, a method, a means for performing acts, or a device readable memory including instructions that, when performed by the device, can cause the device to perform acts), such as can include or use transmitting a hard constraint indicating a time window in which an STA is unavailable to another STA, or receiving an action frame from another STA at a time that is outside the time window.

Example 22 can include or use, or can optionally be combined with the subject matter of at least one of Examples 1-21 to include or use wherein the hard constraint is a first hard constraint and the time window is a first time window, and to include or use receiving a broadcast of a second hard constraint of the another STA, the second hard constraint indicating a second time window in which the another STA is unavailable.

Example 23 can include or use, or can optionally be combined with the subject matter of at least one of Examples 1-22 to include or use receiving a time allocation from the another STA, the time allocation specifying a third time window in which the another STA will transmit the action frame, the third time window outside the first and second time windows indicated by the hard constraint.

Example 24 can include or use, or can optionally be combined with the subject matter of at least one of Examples 1-23 to include or use transmitting the first hard constraint as a bit map, wherein each bit of the bit map corresponds to a specified amount of time and wherein a set bit indicates the STA is unavailable and a not set bit indicates the STA is available.

Example 25 can include or use, or can optionally be combined with the subject matter of at least one of Examples 1-24 to include or use measuring a round trip time or time of flight time for a communication between the STA and the another STA at a time outside the first and second time windows.

Example 26 can include or use, or can be optionally combined with the subject matter of at least one of Examples 1-25, to include subject matter (such as an apparatus, a method, a means for performing acts, or a device readable memory including instructions that, when performed by the device, can cause the device to perform acts), such as can include or use one or more antennas, and wherein the transceiver is coupled to the one or more antennas.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A wireless station (STA) arranged to perform a Time-of-Flight (ToF) measurement, the STA comprising a transceiver arranged to:
    transmit a first hard constraint indicating a first time window in which the STA is unavailable for performing the ToF measurement, wherein the transceiver is arranged to transmit the first hard constraint as a bit map, wherein each bit of the bit map corresponds to a specified amount of time and wherein a set bit indicates the STA is unavailable for performing the ToF measurement and a not set bit indicates the STA is available to perform the ToF measurement;
    receive a broadcast of a second hard constraint of another STA, the second hard constraint indicating a second time window in which the another STA is unavailable for communicating with the STA;
    receive a time allocation from the another STA, the time allocation specifying a third time window in which the another STA will transmit an action frame, the third time window outside the first and second time windows; and
    receive the action frame of the ToF measurement from the another STA at a time that is within the third time window.

2. The STA of claim 1, wherein the transceiver is arranged to receive the action frame within the time allocation and the STA is arranged to determine a round trip time of time of flight of one or more signals communicated between the STA and the another STA at a time outside the first and second time windows.

3. The STA of claim 2, wherein the STA is further arranged to determine a plurality of round trip times or time of flight times, each round trip time or time of flight time for a communication between the STA and a different respective STA.

4. The STA of claim 3, wherein the STA is further arranged to determine a location of the STA as a function of the plurality of round trip times or time of flight times.

5. A wireless station (STA) arranged to communicate with another STA of a plurality of STAs so as to help the another STA perform a Time-of-Flight (ToF) measurement, the STA comprising a transceiver arranged to:
    broadcast to the plurality of other STAs a first hard constraint of the STA, the first hard constraint indicating a first time window in which the STA is unavailable to communicate with the other STAs of the plurality of STAs, wherein the transceiver is arranged to transmit the first hard constraint as a bit map, wherein each bit of the bit map corresponds to a specified amount of time and wherein a set bit indicates the STA is unavailable to communicate with the plurality of other STAs and a not set bit indicates the STA is available to communicate with an STA of the plurality of STAs;
    receive a second hard constraint indicating a second time window in which the another STA is unavailable to perform the ToF measurement; and
    transmit an action frame of the ToF measurement from the STA to the another STA at a time outside the first and second time windows.

6. The STA of claim 5, wherein the transceiver is arranged to transmit a time allocation to the another STA, the time allocation specifying a third time window in which the STA will transmit the action frame, the third time window outside the first and second time windows.

7. The STA of claim 6, wherein the transceiver is arranged to transmit the first hard constraint as one or more parameters indicating a beginning time and ending time of a period of time in which the STA is unavailable.

8. The STA of claim 5, wherein the transceiver is arranged to transmit the specified amount of time in the broadcast.

9. The STA of claim 5, wherein the specified amount of time is predetermined and the transceiver is not arranged to transmit the specified amount of time in the broadcast.

10. The STA of claim 5, wherein the STA is arranged to compress, using a lossless compression technique, data corresponding to the bit map prior to broadcasting the first hard constraint.

11. A method comprising:
    transmitting, using a transceiver, a first hard constraint indicating a first time window in which a station (STA) is unavailable, wherein transmitting the first hard constraint includes transmitting the first hard constraint as a bit map, wherein each bit of the bit map corresponds to a specified amount of time and wherein a set bit indicates the STA is unavailable and a not set bit indicates the STA is available;

receiving, using the transceiver a broadcast of a second hard constraint of another STA, the second hard constraint indicating a second time window in which the another STA is unavailable;

receiving, using the transceiver, a time allocation from the another STA, the time allocation specifying a third time window in which the another STA will transmit an action frame, the third time window outside the first and second time windows indicated by the first and second hard constraints; and receiving, using the transceiver, the action frame from the another STA at a time that is within the third time window.

* * * * *

UNITED STATES PATENT AND TRADEMARK OFFICE
CERTIFICATE OF CORRECTION

PATENT NO. : 9,924,397 B2  
APPLICATION NO. : 14/912347  
DATED : March 20, 2018  
INVENTOR(S) : Segev et al.

Page 1 of 1

It is certified that error appears in the above-identified patent and that said Letters Patent is hereby corrected as shown below:

In the Claims

Column 13, Line 4, Claim 11, after "transceiver", insert --,--

Signed and Sealed this
Fourteenth Day of April, 2020

Andrei Iancu
*Director of the United States Patent and Trademark Office*